United States Patent [19]

Halterman, Jr.

[11] 4,006,940
[45] Feb. 8, 1977

[54] ROLLER FRAME FOR CRAWLER TRACTOR

[75] Inventor: Francis J. Halterman, Jr., Ravenna, Ohio

[73] Assignee: General Motors Corporation, Detroit, Mich.

[22] Filed: Jan. 8, 1976

[21] Appl. No.: 647,358

[52] U.S. Cl. .................................. 305/12; 305/28
[51] Int. Cl.² ........................................ B62D 25/16
[58] Field of Search .................. 305/12, 11, 24, 25, 305/28, 60

[56] References Cited
UNITED STATES PATENTS

| | | | |
|---|---|---|---|
| 2,418,610 | 4/1947 | Webb | 305/12 X |
| 2,823,079 | 2/1958 | Williams | 305/28 |

*Primary Examiner*—Robert B. Reeves
*Assistant Examiner*—John P. Shannon
*Attorney, Agent, or Firm*—Edward J. Biskup

[57] ABSTRACT

A roller frame for a crawler tractor for supporting the body portion of the tractor and including a pair of laterally spaced and parallel side rail members rigidly interconnected to form an elongated unitary member. Each of the side rail members have an upper edge and a lower edge with the latter having at least two generally U-shaped cut-out portions formed therein so as to provide a front support surface, an intermediate support surface, and a rear support surface. A plurality of rollers are adapted to be supported in each of the cut-out portions and a shield extends between each adjacent pair of support surfaces and is fastened thereto so as to enclose the lower portions of the rollers and prevent rocks and the like from gaining access into the roller frame.

3 Claims, 5 Drawing Figures

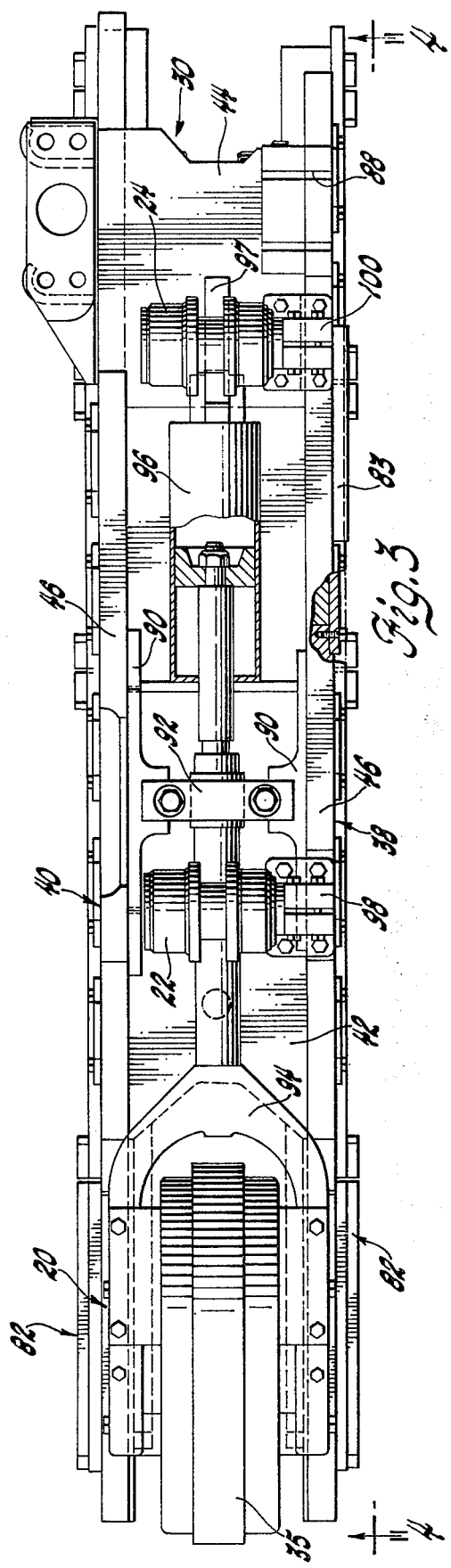
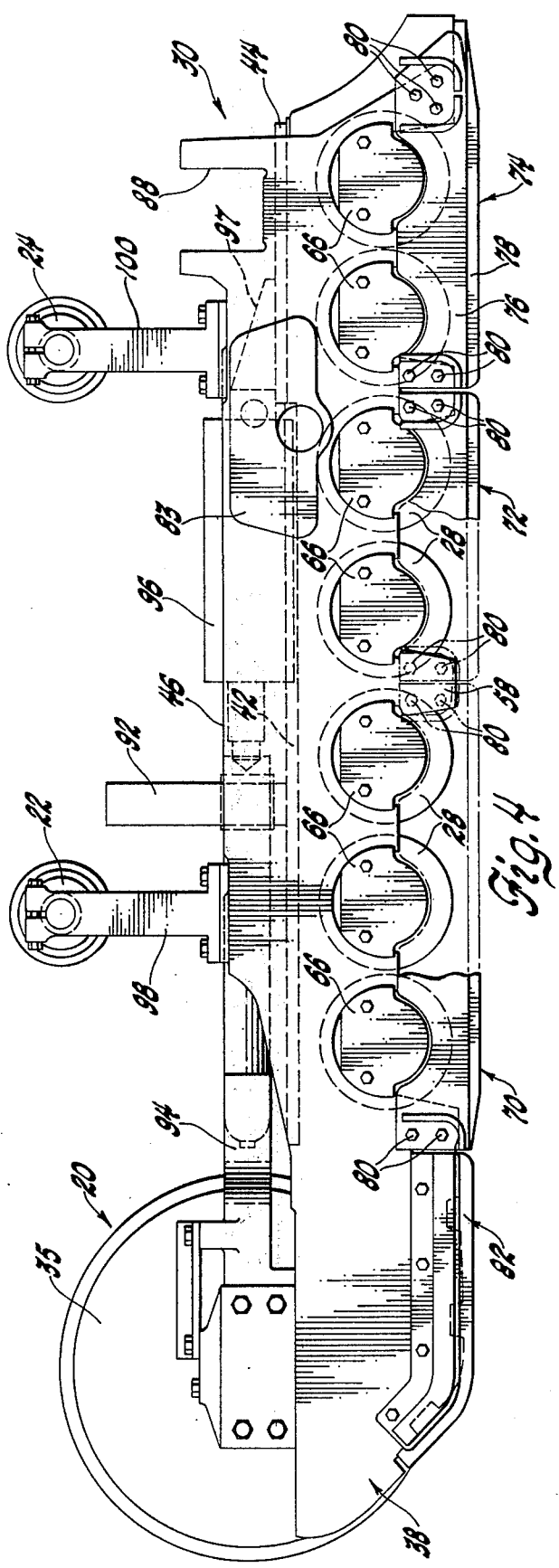

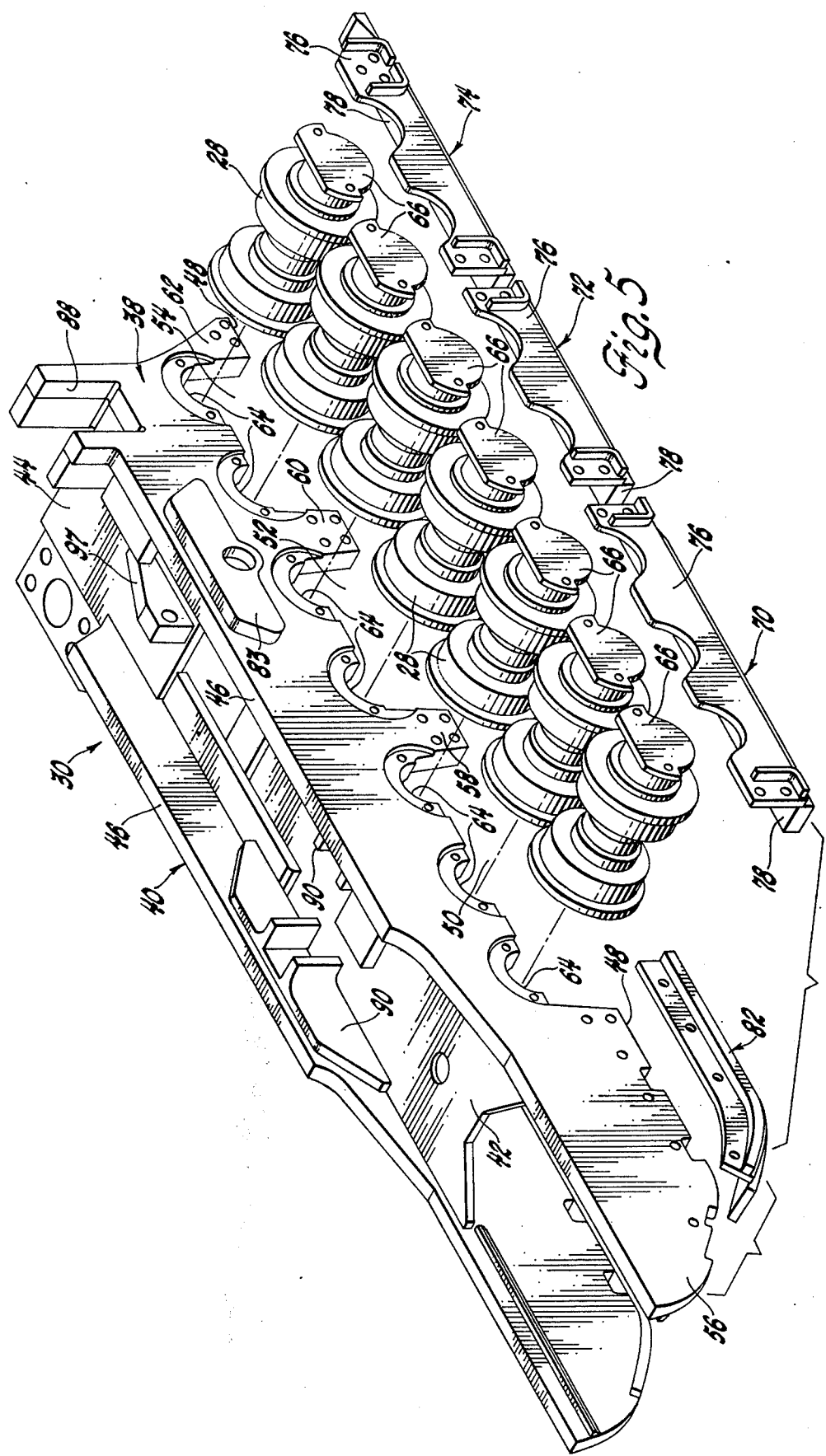

ROLLER FRAME FOR CRAWLER TRACTOR

The typical track roller frame employed with a crawler tractor serves as a base for mounting the track components to the tractor body frame. The roller frame can be a fabricated item consisting of two heavy side rails and a top plate and usually is secured to the body frame at two points by a pivot shaft housing and an equalizer bar. The pivot shaft housing is bolted to the rear of the roller frame and the equalizer bar is connected to an intermediate portion of the roller frame. These two components keep the roller frame in alignment with the main frame and also prevent the roller frame from moving backward or forward along its longitudinal axis.

The present invention concerns a roller frame of the above-described type for use with a crawler tractor which at each side is provided with a drive sprocket and an endless track composed of a plurality of track shoes interconnected by the usual pivot pins. The roller frame, according to the invention, is adapted to support the body portion of the tractor on the lower run of the track, and in the preferred form comprises a pair of laterally spaced and parallel side rail members rigidly interconnected to form an elongated unitary member having a front end and a rear end. An idler wheel is rotatably supported by the front end of the roller frame between the side rail members and pivot means are provided for connecting the rear end of the roller frame to the body portion of the tractor. Each of the side rail members has an upper edge and a lower edge with the latter being formed with at least two generally U-shaped cut-out portions along its longitudinal length so as to provide each of the side rail members with a front support surface, an intermediate support surface, and a rear support surface all of which are located in a common vertical plane. A plurality of rollers are rotatably supported in each of the cut-out portions and a shield extends between each adjacent pair of support surfaces. The shield is L-shaped in cross section so as to provide a pair of legs located in mutually perpendicular planes so when the shield is fastened to an adjacent pair of support surfaces, one of the legs extends horizontally towards the pins of the endless track so as to enclose the rollers and prevent rocks and the like from gaining access into the roller frame.

The objects of the present invention are to provide a new and improved roller frame that is designed to accommodate rock shields which are attachable to the roller frame by horizontally accessible mounting bolts so as to reduce the time and effort to install and remove the shields; to provide a new and improved roller frame for a crawler tractor having at least two U-shaped cut-out portions formed in the lower edge of each side rail member of the roller frame so as to provide front, intermediate, and rear vertical support surfaces which serve as mounting surfaces for a plurality of rock shields in a manner that allows side loading to be taken directly through the side rail members; and to provide a new and improved roller frame that is constructed so as to receive L-shaped rock shields which are removably attachable to vertically oriented planar surfaces formed on and depending from the side rail members of the roller frame.

Other objects and advantages of the present invention will be apparent from the following detailed description when taken with the drawings in which:

FIG. 3 is an enlarged plan view showing the roller frame assembly separated from the tractor main frame and endless track;

FIG. 4 is a side elevational view of the roller frame assembly taken on line 4—4 of FIG. 3; and FIG. 5 is an exploded view showing certain parts of the roller frame assembly.

Figure 1:
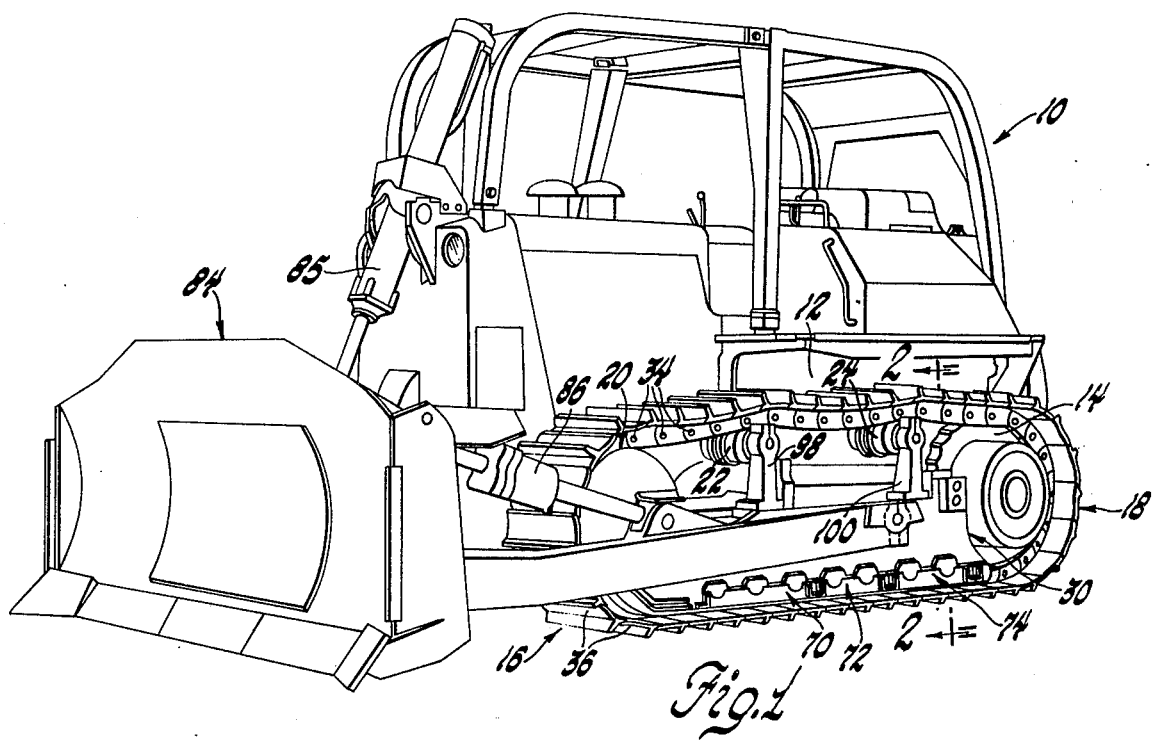
FIG. 1 is a perspective view of a crawler tractor incorporating a roller frame assembly made in accordance with the invention.

Referring to the drawings and more particularly FIG. 1, a crawler tractor 10 is shown having a main body portion 12 which supports an engine for providing drive to a pair of drive sprocket wheels located on the opposite sides of the vehicle and one of which only is shown and identified by reference numeral 14. Also disposed on the opposite sides of the tractor body portion are a pair of laterally aligned and longitudinally extending track frame assemblies 16 each of which has an endless ground engaging track 18 entrained thereabout. The track frame assemblies 16 are mounted for vertical swinging movement on the opposite ends of a transversely extending pivot shaft (not shown) which is rigidly secured at its mid portion to the main body portion of the tractor. The pivot shaft is aligned in parallel relation with the axis of rotation of the drive sprocket wheel 14 the latter of which is rotatably supported on the tractor main body portion in longitudinal alignment with the track frame assembly. In order to support the forward end of the tractor frame assemblies 16 in a normal horizontal position as well as prevent uncontrolled angular spreading and converging of the track frame assemblies, there is provided a transversely extending equalizer bar (not shown) which is pivotally connected at its mid-point to a longitudinally extending pivot shaft carried by the tractor main body portion.

Figure 2:
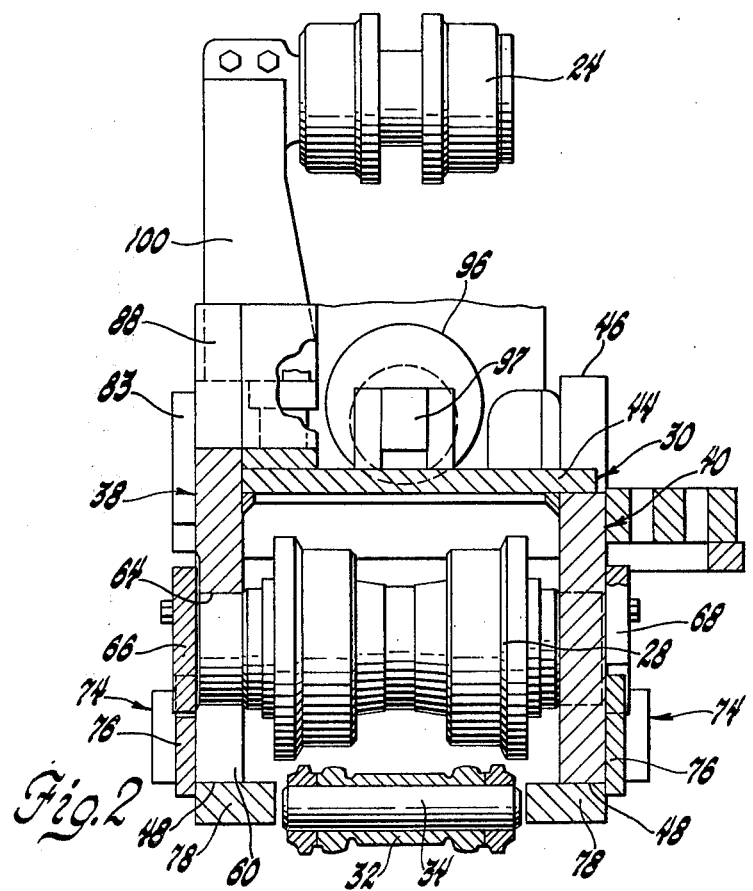
FIG. 2 is an enlarged sectional view of the roller frame assembly taken on line 2—2 of FIG. 1.

More specifically, each track frame assembly 16 consists of a front idler assembly 20, a pair of carrier rollers 22 and 24, recoil cylinder 96, a plurality of identical track rollers 28, and a track roller frame 30. The track 18 envelops the track roller frame 30 and takes the form of a continuous chain composed of two rows of identical forged steel links held together by pins and bushings. As seen in FIGS. 1 and 2, the configuration of each pair of longitudinally aligned links is such that when joined by a bushing 32 and a pin 34, their ends overlap and in this way one end of each link is inboard at a joint while the other end is outboard at the next joint. Each pin 34 is free to turn which permits the links to pivot allowing the chain to follow the curvature of a front idler 35 and the drive sprocket 14. Heavy steel shoes 36 are bolted to each link to give the tractor the necessary traction.

As seen in FIGS. 2-5, the track roller frame 30 comprises a pair of laterally spaced and parallel side rail members 38 and 40 rigidly interconnected by a pair of top plate members 42 and 44. Each of the side rail members 38 and 40 has an upper edge 46 and a lower edge 48 with the latter having three generally U-shaped cut-out portions 50, 52, 54 formed therein so as to provide each of the side rail members with a front support surface 56, a pair of intermediate support surfaces 58 and 60, and a rear support surface 62 all of which are located in a common vertical plane. It should be noted that each side rail member 38 and 40, in the area of each of the cut-out portions 50, 52 and 54 is formed with at least two identical semicircular openings 64 and each laterally aligned pair of openings 64 serve to accommodate a track roller 28. As seen in FIG. 2 the inboard and outboard bearing cages 66 and 68 of each track roller 28 are adapted to be bolted to the side rail members 38 and 40 of the roller frame.

As best seen in FIGS. 2, 4 and 5, a rock shield is provided between each adjacent pair of support surfaces of the track roller frame 30. Thus, each side rail member 38 and 40 has three rock shields 70, 72, and 74 along its length and each rock shield is generally L-shaped in cross-section so as to provide a pair of legs 76 and 78 located in mutually perpendicular planes. Each rock shield is adapted to be fastened to the adjacent support surfaces of the roller frame 30 through a plurality of cap screws 80 whereby the leg 78 extends horizontally towards the pins of the track 18 so as to enclose the track rollers 28 and prevent rocks and the like from moving into the area of the track rollers. Forwardly of the rock shields 70, 72 and 74, each side rail member 38 and 40 is provided with a front wear plate 82 which is also L-shaped in cross section and is normally spaced from the inner portion of the track 18. In addition, side rail member 38 is provided with a bracket 83 which serves to pivotally support one push arm of a dozer assembly 84 that is adjustable to various operating positions through a lift cylinder 85 and tilt cylinder 86.

As alluded to hereinbefore, each of the track frame assemblies 16 are connected to the tractor body portion for vertical swinging movement by a pivot shaft and an equalizer bar. In this connection, it will be noted that each roller frame 30 is formed with a U-shaped pocket 88 at its rear end which provides a mounting area for a pivot housing that supports one end of the pivot shaft. Also, attached to the inner side wall of each rail member 38 and 40 is a support bracket 90 to which is secured a housing 92, as seen in FIGS. 3 and 4, for pivotally supporting one end of the equalizer bar. For a more detailed description of the general type of pivot shaft and equalizer bar arrangement employed with this tractor 10, attention is directed to U.S. Pat. No. 2,786,724 which issued on Mar. 26, 1957 and is assigned to the assignee of this invention.

The front idler assembly 20 supports the track 18 at the forward end of the roller frame 30. The idler 35 is mounted between the roller frame side rails 38 and 40 at the front end thereof and is designed to slide fore and aft on the upper parts of the side rail members, support the track 18 and maintain track tension. As seen in FIGS. 3 and 4, the idler 35 is rotatably supported by a yoke 94, which in turn, is connected to the piston portion of a recoil cylinder 96 which is pivotally connected to a bracket 97 fixed to the plate 44. The recoil cylinder utilizes compressed nitrogen gas as a shock absorbing agent located on the piston side of the recoil cylinder and a quantity of grease is contained in the cylinder on the piston rod side of the cylinder. Thus, when a shock load is placed on the front idler it tends to slide rearwardly causing the piston to retract. This action compresses the gas behind the piston and thereby the shock is dampened and absorbed. When the shock has abated, the compressed gas forces the piston back in the opposite direction to maintain track tension.

The carrier rollers 22 and 24 support the upper run of the track between the drive sprocket 14 and the front idler 35. The carrier rollers 22 and 24 are rotatably mounted on supports 98 and 100, respectively, which are bolted to the upper edge 46 of the track roller frame 30. The track rollers 28 are in contact with the lower run of the track and support the entire weight of the tractor.

Thus, from the above description, it should be apparent that a track roller frame is provided that is designed to have rock shields attached thereto by horizontally accessible screws. Also, by having the side rail members 38 and 40 formed with the cut-out portions as seen in FIG. 5, any side loading imposed on the rock shields through the track will be taken by the side rail members directly.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. A roller frame for a crawler tractor having a body portion each side of which is provided with a drive sprocket and an endless track composed of a plurality of track shoes interconnected by pivot pins, said roller frame adapted to support said body portion on the lower run of said endless track and comprising a pair of laterally spaced side plate members rigidly interconnected to form an elongated unitary member having a front end and a rear end, an idler wheel rotatably supported by the front end of the roller frame between the side plate members, pivot means for connecting the rear end of the roller frame to said body portion, each of said side plate members having an upper edge and a lower edge, said lower edge having at least two cut-out portions formed therein so as to provide said each of said side plate members with a front support surface and an intermediate support surface and a rear support surface, said front, intermediate and rear support surfaces being located in a common vertical plane, a plurality of rollers rotatably supported in each of said cut-out portions, a shield extending between each adjacent pair of support surfaces and being L-shaped in crosssection so as to provide a pair of legs located in mutually perpendicular planes, and fastener means fixedly attaching one leg of said shield directly to said adjacent pair of support surfaces whereby the other leg extends horizontally towards the pins of the endless track so as to enclose said rollers and prevent rocks and the like from gaining access into the roller frame.

2. A roller frame for a crawler tractor having a body portion each side of which is provided with a drive sprocket and an endless track composed of a plurality of track shoes interconnected by pivot pins, said roller frame adapted to support said body portion on the lower run of said endless track and comprising a pair of laterally spaced and parallel side plate members rigidly interconnected to form an elongated unitary member having a front end and a rear end, an idler wheel rotatably supported by the front end of the roller frame between the side plate members, pivot means for connecting the rear end of the roller frame to said body portion, each of said side plate members having an upper edge and a lower edge, said lower edge having at least two generally U-shaped cut-out portions formed therein so as to provide said each of said side plate members with a front support surface and an intermediate support surface and a rear support surface, said front, intermediate and rear support surfaces being located in a common vertical plane, a plurality of rollers rotatably supported in each of said cut-out portions, a shield extending between each adjacent pair of support surfaces and being L-shaped in cross-section so as to provide a pair of legs located in mutually perpendicular planes, and fastener means fixedly attaching one leg of said shield directly to said adjacent pair of support surfaces whereby the other leg extends horizontally towards the pins of the endless track so as to enclose said rollers and prevent rocks and the like from gaining access into the roller frame.

3. A roller frame for a crawler tractor having a body portion each side of which is provided with a drive sprocket and an endless track composed of a plurality of track shoes interconnected by pivot pins, said roller frame adapted to support said body portion on the lower run of said endless track and comprising a pair of laterally spaced and parallel side plate members rigidly interconnected to form an elongated unitary member having a front end and a rear end, an idler wheel rotatably supported by the front end of the roller frame between the side plate members, pivot means for connecting the rear end of the roller frame to said body portion, each of said side plate members having an upper edge and a lower edge respectively located in vertically spaced horizontal planes, said lower edge having at least two generally U-shaped cut-out portions formed therein so as to provide said each of said side plate members with a front support surface and an intermediate support surface and a rear support surface, said front, intermediate and rear support surfaces being located in a common vertical plane, a plurality of rollers rotatably supported in each of said cut-out portions above a horizontal plane passing through said lower edge, a shield extending between each adjacent pair of support surfaces and being L-shaped in cross-section so as to provide a pair of legs located in mutually perpendicular planes, and horizontally accessible fastener means fixedly attaching one leg of said shield at the side portions thereof directly to said adjacent pair of support surfaces whereby the other leg extends horizontally towards the pins of the endless track so as to enclose said rollers and prevent rocks and the like from gaining access into the roller frame.

* * * * *